United States Patent [19]

Irelan et al.

[11] 3,959,878
[45] June 1, 1976

[54] CONVERTIBLE PORTABLE ELECTRIC TOOL

[75] Inventors: Edward A. Irelan, Columbia, Mo.; David W. Dorheim, Baltimore, Md.; William Frederick Robotham, St. Charles, Ill.

[73] Assignee: McGraw-Edison Company, Elgin, Ill.

[22] Filed: Apr. 2, 1975

[21] Appl. No.: 564,280

[52] U.S. Cl. .................................. 30/220; 30/223
[51] Int. Cl.² ................ B26B 19/02; B26B 19/06
[58] Field of Search ................ 30/DIG. 1, 216, 220, 30/221, 222, 223, 272 A, 41.6, 43.92

[56] References Cited
UNITED STATES PATENTS

| | | | |
|---|---|---|---|
| 1,357,031 | 10/1920 | Daugherty | 30/220 X |
| 3,172,200 | 3/1965 | Ream | 30/43.92 X |
| 3,321,831 | 5/1967 | Harr | 30/43.92 X |
| 3,365,796 | 1/1968 | Tolmie | 30/43.92 |
| 3,851,388 | 12/1974 | Weber | 30/223 |
| 3,854,203 | 12/1974 | Paule | 30/220 |

Primary Examiner—Al Lawrence Smith
Assistant Examiner—J. C. Peters
Attorney, Agent, or Firm—Charles F. Lind

[57] ABSTRACT

This invention teaches a convertible portable electric tool having a common power housing and different operating tool output pieces which can be releasably secured to said power housing without the need of any tools. Each of the tool output pieces has a stationary element and a movable element supported by the stationary element. The power housing has an exposed drive element which can cooperate with and drive the movable element when the statonary element is properly positioned relative to the housing. The stationary element in turn is sized to cooperate with the housing to cover the exposed drive element and be accurately positioned and held in place against the housing. Flexible fingers cantilevered integrally from the housing have free end flexure parallel to the stationary element, and further have projections on the finger ends that interlock with the positioned stationary element to hold it operatively in place relative to the housing. Exposed grip areas on the flexible fingers allow for manually flexing of the fingers to lock and release the tool output piece.

1 Claim, 11 Drawing Figures

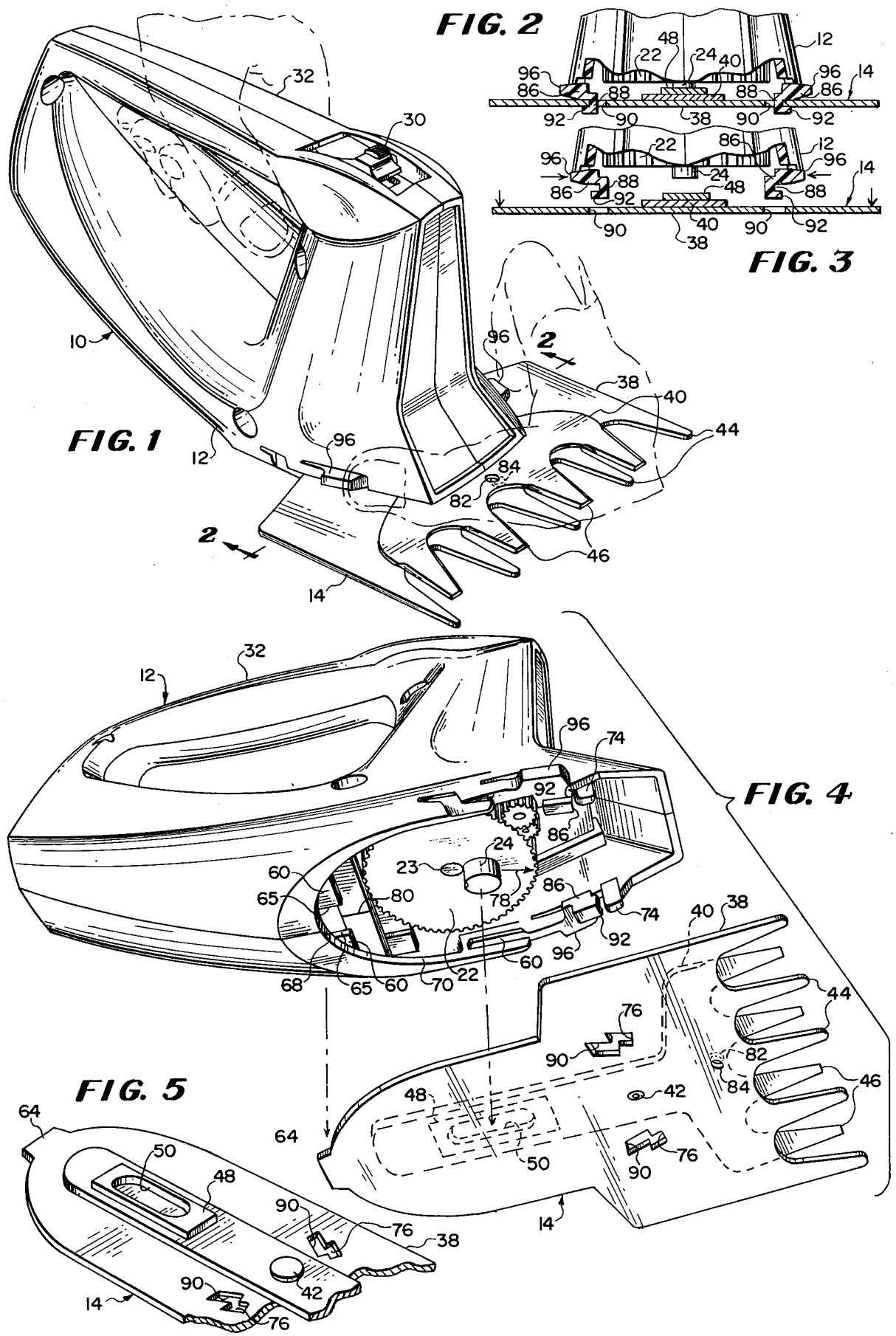

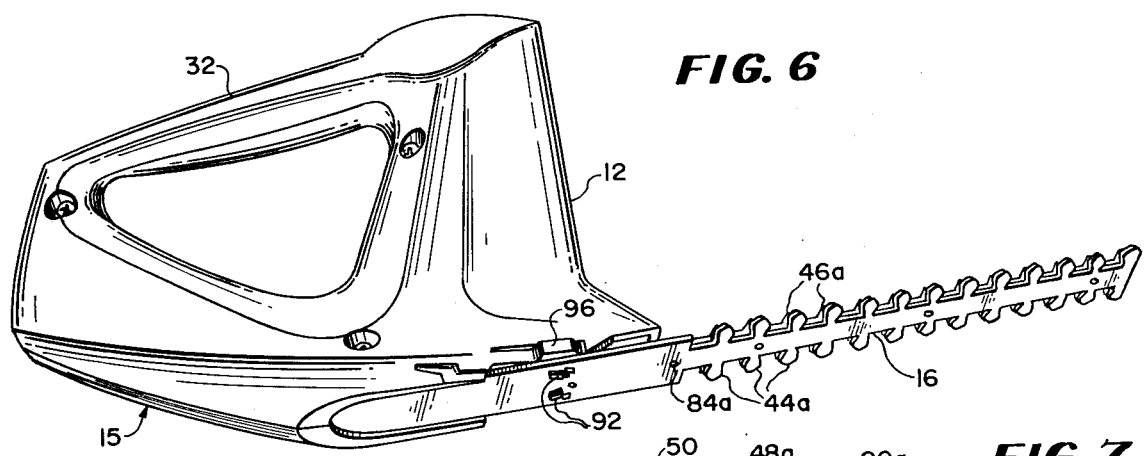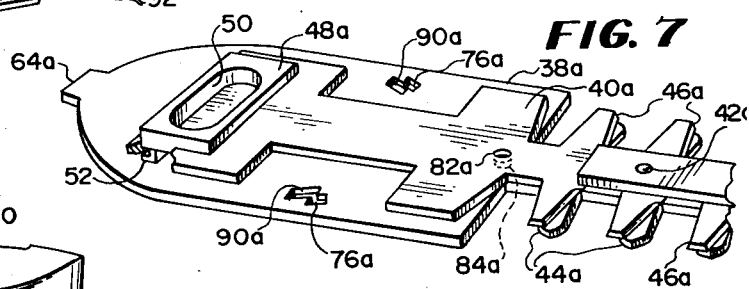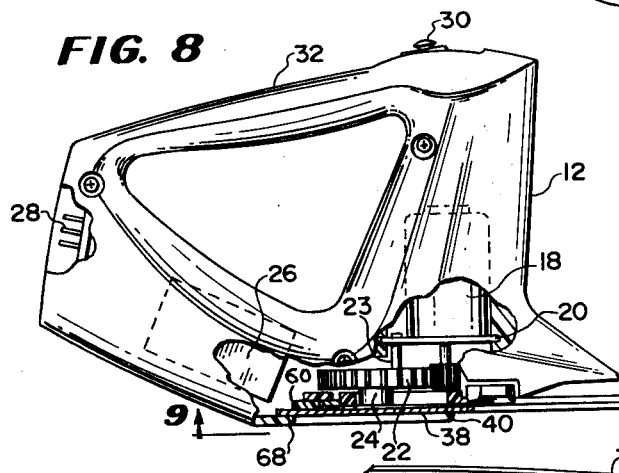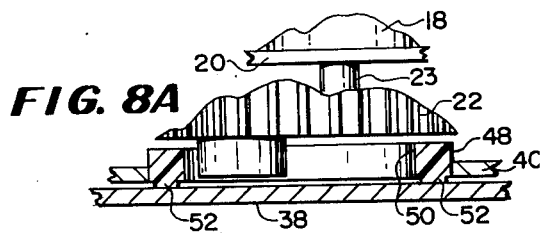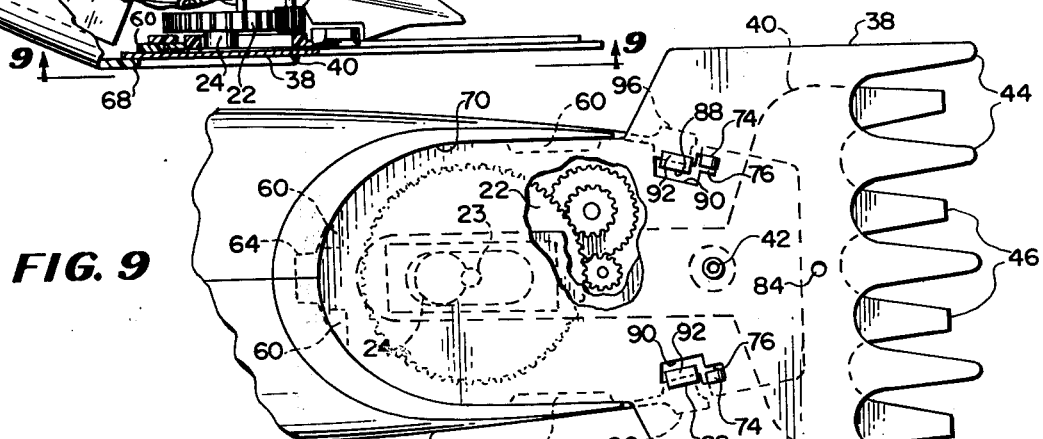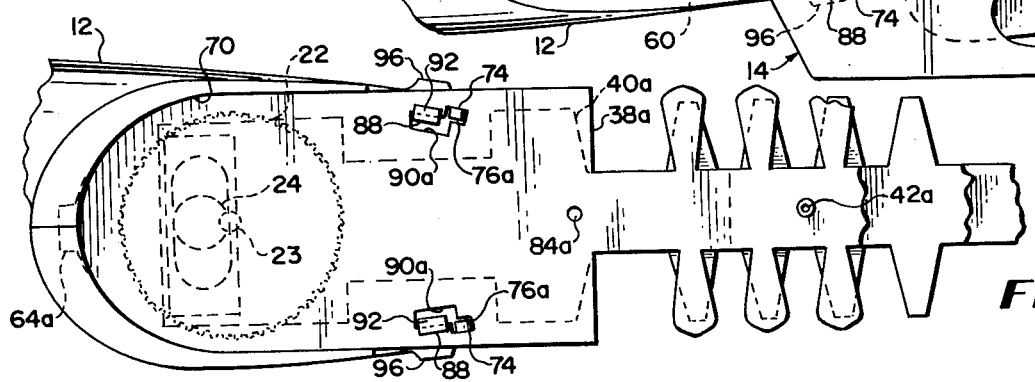

CONVERTIBLE PORTABLE ELECTRIC TOOL

Most, if not all, power tools have a power unit such as a housed electric motor and an output tool head powered by the motor which is specifically designed for performing a tool function properly. For example, power tools for trimming grass or cutting hedges require separate cutting tool heads of different operating characteristics. The total costs to the user of having one of each type tool with the duplicated power housings are more typically than would be required if different tool heads could be powered by a common power housing.

This invention relates to a power tool design which has a common power housing and readily separable connection means with separate tool output heads or pieces, each designed for a specific end purpose. The design allows for the securement of the tool piece to and/or the release of same from the power housing without the need of tools such as screwdrivers, wrenches, pliers, or the like. This invention has particular advantage in the battery powered outdoor lawn and garden type tool, such as grass trimmer, hedge clipper, or the like, because of the common usage of these tools by women or other persons normally lacking power tool expertise.

The subject invention will be more fully understood and appreciated after referring to the following specification, including the accompanying drawings, wherein:

FIG. 1 is a perspective view showing a first embodiment of the subject invention incorporated in a portable hand-held grass trimmer;

FIG. 2 is a sectional view as seen generally from line 2—2 in FIG. 1;

FIG. 3 is a sectional view similar to FIG. 2, except showing the cutting blades or tool piece separated from the power housing;

FIG. 4 is a perspective view as seen from the underside of the tool shown in FIG. 1, except with the cutting blades or tool piece removed from the power housing;

FIG. 5 is a perspective view, looking down as from the inside of the power housing, of the tool piece showing the separable drive connection means and piece mounting means;

FIG. 6 is a perspective view of a second embodiment of the subject invention incorporated as a portable hand-held hedge trimmer;

FIG. 7 is a perspective view, looking down as from the inside of the power housing, of a portion of the tool piece used in FIG. 6;

FIG. 8 is an elevational view, partly in section, of the tool shown in FIG. 1;

FIG. 8a is an enlarged view of a portion of FIG. 8 showing the separable drive connection between the tool piece and the power housing;

FIG. 9 is a bottom view, partly broken away for clarity of disclosure, as seen generally from line 9—9 in FIG. 8; and FIG. 10 is a partial bottom view of the tool shown in FIG. 6.

The disclosed tool 10 (FIGS. 1 and 4) has a power housing 12 and tool piece 14; while the disclosed tool 15 (FIG. 6) utilizes the same power housing 12 and a different tool piece 16. The common power housing 12 preferably has an outer shell formed of a durable plastic material and is hollow to provide therewithin an electric motor 18 (FIG. 8) mounted on plate 20. The motor output shaft is connected through a speed reduction unit ultimately to power drive gear 22 rotated about stub shaft 23 secured to the plate 20. A drive element 24 is integral with or connected to the drive gear eccentrically of or offset from the stub shaft. A battery unit 26 is also supported within the housing shell, and appropriate connection means between external terminals 28, an on-off switch actuated by a button 30, the motor and the battery unit provide for powering the motor 18 or changing the battery unit 26 selectively as required. The housing handle 32 is in close proximity to the switch button 30 so that operation of the latter is possible typically by manipulation of the thumb and/or forefinger as the design may warrant, while holding the tool with only one hand.

As indicated, the tool piece 16 shown in FIG. 6 is illustrious of a hedge trimmer whereas the tool piece 14 shown in FIGS. 1 and 4 is more illustrious of a grass trimmer. In either tool piece, however, there is a stationary element and a moving element supported from and in a manner by the stationary element to move relative thereto. Specifically designed teeth in each of the stationary and moving elements cross one another during this movement and thereby effect a required cutting action. The stationary element is supported from the shell of the power housing, while the moving element is moved by a suitable connection with the drive element 24.

The grass trimmer tool piece 14 shown in FIGS. 1, 4, 5, 8, and 9 includes stationary element 38 and moving element 40 pivoted together at pin 42 so that the moving element oscillates about this pin. The stationary element has a comb of teeth 44 and likewise the moving element 40 has a comb of teeth 46 and the same lap one another to cut grass between the blades upon oscillation of the moving element. The rearward end of the moving element has a large opening therein for receipt of a plastic bearing member 48 and this bearing member has an elongated opening 50 which is adapted to receive the drive element 24. Specifically, the bearing opening across the narrow dimension is just slightly larger than the drive member 24 and across the long dimension is larger than this by twice the offset distance of the drive member from the shaft 23. Thus, the drive member fits within the opening 50 with only nominal side clearance and rotation of the gear 22 and the resulting circular movement of the drive element oscillates the moving element about the pivot pin as is well known. Ears 52 from the rearward side of the bearing member project inwardly beyond the moving tool element at the opening to serve as anti-friction spacer means between the adjacent elements and also to hold the bearing in place within the moving tool element opening.

The stationary tool element is designed to fit securely against the housing 12 and the separable drive means is provided as noted above between the drive element 24 and the moving tool element. The stationary element securement means is formed in part by support ledges 60 integral with the housing that extend inwardly across the housing cavity within which the drive gear 22 and drive element 24 are located, and the stationary element is shaped at its rearward end to compliment the contour of the housing and the same abuts the ledges and is restrained against movement in the direction towards the gear element. The rear part of the stationary element further has a tongue 64 which fits between opposed shoulders 65 and under wall structure 68 formed on the housing, and these restrain separating and lateral movement of the rear part of the stationary element when the same is trapped between the wall structure and adjacent ledge. The housing further has a peripheral lip 70 which is designed to embrace the sides of the stationary element to help locate and hold the element relative to the housing. Guide posts 74 integral with the housing fit rather snuggly within openings 76 in the stationary element to locate the front of the stationary element relative to the housing. The guide posts only fit within the cooperating openings when the rear part of the stationary element is firmly trapped between the opposed shoulders 65 and the ledge and wall structure 68, so that in assembling the tool piece relative to the housing the rear end of the stationary element is first guided in place and then the forward part of the stationary element is moved against the housing and the posts fit within the openings 76.

The stationary element is complimentary to the open bottom of the housing shell to completely enclose the open housing cavity and cover the drive element 24. In this regard, the stationary element can be brought into position relative to the housing only when the drive element 24 is properly received within the opening 50 of the bearing 48 and in order to accomodate this it is preferable that the gear 22 be rotated manually to bring a mark 78 thereon in line with a corresponding mark 80 on a housing, where typically for example, the drive element 24 might be at a top dead center position in direct line across the stub shaft 23 and the pivot pin 42. In like manner the moving element is preferably manually oriented so that an exposed hole 82 in the piece lines up with a hole 84 in the adjacent stationary element. Upon completing these preliminary steps, the drive element can easily fit within the bearing opening of the moving element upon bringing the stationary tool element into proper registry relative to the housing.

Once the stationary tool element is brought into proper registry and located over the guide post as noted, there are means further provided for maintaining the tool piece releasably secured against the housing. The releasable means takes the form of flexible fingers 86 on the forward sides of the housing spaced outwardly from the drive element 24. Each finger 86 is cantilevered integrally from the housing shell, and since as noted the same is made of a resilient plastic material, moderate flexure of each finger is allowed while providing sufficient resiliency to return the free end of the finger to its normal unflexed position. A projection 88 on the free end of the finger 86 extends in a direction normal to the plane of the stationary element as the same is properly positioned against the housing, and is designed to fit within a complimentary opening 90 in the stationary element. The projection further has a tab 92 thereon which forms a shoulder spaced from the main body of the finger a distance corresponding generally to the thickness of the stationary element, and the tab therefore is designed to snap past the stationary element on the side opposite the finger when the stationary element is properly positioned and the lock is set; and the lock is held set under the natural resiliency of the finger. Although this consequently holds the forward portion of the stationary element against the housing ledges, most of the actual load applied to the stationary element of the tool piece is absorbed by the closely disposed guide posts fitting cooperatively within the openings on the stationary element. The outward exposed sides of the fingers have grip areas 96 which are conveniently situated on opposite sides and at the front of the tool housing to allow the elements to be gripped simultaneously by the thumb and fingers of the user to flex the fingers and release or set the locking shoulder 92 of the projection from or beyond the stationary element.

The tool piece 16 (FIGS. 6, 7, and 10) is similar, as noted, to the grass trimmer tool piece 14 in all manners of securement of the stationary element relative to the housing and in most matters regarding the separable drive connection to the moving element. The tool piece includes a stationary element 38a and a moving element 40a, and the moving element is guided by pins 42a located at spaced intervals along the cooperating elements to guide the moving element in a linear reciprocating manner as is well known. The stationary element has a comb of teeth 44a and likewise the moving element 40a has a comb of teeth 46a and the same are designed to lap one another so that reciprocation of the moving element along the length of the cutting tool piece cuts hedges and the like located between the blades. In order to have reciprocating movement of the moving element, the orientation of the bearing member 48a is fixed crosswise to that shown with tool piece 14, and likewise the locating holes 82a and 84a in the moving tool element and stationary element are adjusted to line up properly for freely receiving the drive element 24 of the power housing. All other components or features of the construction in the tool piece common to that already described relative to tool piece 14 are identified with the same number, followed by the suffix (a), including specifically a similar rear end configuration of the stationary element and moving element and the hole spacing 76a and 90a in the stationary element, operable to cooperate readily with the housing in operative confinement relative to the spaced ledges 60, opposed shoulders 65, wall structure 68, guide posts 74, and flexible fingers 86.

The specific construction of either tool piece 14 or 16 is not of too much significance to this invention since other like prior art cutting devices can probably be adapted to function properly with little modification, and/or other type tool pieces can be used with the same power housing. The important aspect of this invention is the ready securement to or removal from the common power housing of the different tool piece, and all without the need for securing nuts, bolts, or screws and/or of tools, since manipulation only of the flexible fingers integrally formed with the housing is all that is required to set or release the trapped tool piece.

Other significant commercial products can be readily made from this basic power housing, and securement and drive connection means, with only the grass clipper and hedge clipper being shown. The success of this concept and line of products requires only that the stationary element be secured to the shell of the power housing and the moving element becomes separably connected with the drive element of the power housing during the placement of the stationary element relative to the housing, and that the moving element is supported by the stationary element and its motion relative to the stationary element provides for the useful tool output.

What is claimed is:

1. In a portable electric tool having a power housing and a plurality of different tool output pieces, where each output piece has a stationary element and an element supported thereby to move relative to the former effective to define a specific tool output, and where the power housing has an exposed drive element, the improvement being means for releasably securing, without the need of any tools, any such output piece operatively to the housing so that an operable drive connection is provided between the movable element and the drive element, the combination comprising positioning means including wall structures formed on the housing at locations spaced from and generally about the drive element, ledges outstanding from certain of the wall structures in approximate right angle relations thereto and disposed generally in a common plane offset laterally from the drive element, guide posts formed on the housing to project beyond the plane of the ledges in the direction remote from the drive element, and the stationary element being sized to cooperate with the housing to fit closely within the wall structures and against the ledges and with the guide posts fitted within corresponding guide openings on the stationary element and in generally snug relationship relative thereto so as to locate and stabily support the stationary element and thus the output piece in proper position relative to the housing; and locking means for retaining the so positioned tool piece in place and including opposed finger actuated elements supported to move only along paths generally parallel to the plane of the ledges and having projections that are generally at right angles to the positioned stationary element which fit through corresponding lock openings in the stationary element, and outwardly facing locking shoulders formed on the projections adjacent the free ends thereof adapted upon movement of the finger engaging elements toward one another to clear the stationary element and likewise allow thereby the same to fit through the lock openings and further upon movement then of the finger actuated elements away from one another to overlie the stationary element on the side thereof remote from the drive element to preclude separation of the positioned stationary element from the housing, and means for resiliently biasing the finger actuated elements apart.

\* \* \* \* \*